(12) United States Patent
Wilczynski et al.

(10) Patent No.: US 11,347,703 B1
(45) Date of Patent: May 31, 2022

(54) SYSTEM AND METHODS FOR OBJECT VERSION TRACKING AND READ-TIME/WRITE-TIME DATA FEDERATION

(71) Applicant: Palantir Technologies Inc., Palo Alto, CA (US)

(72) Inventors: Peter Wilczynski, San Francisco, CA (US); Alexander Ryan, Palo Alto, CA (US); Allen Chang, Sunnyvale, CA (US); Daniel Cervelli, Mountain View, CA (US); Julie Tibshirani, Palo Alto, CA (US); Timothy Wilson, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 433 days.

(21) Appl. No.: 16/203,167

(22) Filed: Nov. 28, 2018

Related U.S. Application Data (60) Provisional application No. 62/596,673, filed on Dec. 8, 2017.

(51) Int. Cl.
*G06F 16/21* (2019.01)
*G06F 16/2455* (2019.01)
(Continued)

(52) U.S. Cl.
CPC ........ *G06F 16/219* (2019.01); *G06F 16/2329* (2019.01); *G06F 16/2456* (2019.01); *G06F 16/2474* (2019.01)

(58) Field of Classification Search
None
See application file for complete search history.

(56) References Cited

U.S. PATENT DOCUMENTS

| | | | |
|---|---|---|---|
| 3,747,757 A | 7/1973 | Freis et al. | |
| 4,778,219 A | 10/1988 | Wilczynski et al. | |
| (Continued) | | | |

OTHER PUBLICATIONS

Chen et al., "Context-Aware Mashup for Smart Mobile Devices," 2012 IEEE Asia-Pacific Services Computing Conference Year: 2012, pp. 179-186.

(Continued)

*Primary Examiner* — Christopher J Raab
(74) *Attorney, Agent, or Firm* — Sheppard Mullin Richter & Hampton LLP (57) ABSTRACT

Systems and methods are provided in order to avoid ingesting the entire contents of one or more data sources. An object may be associated with one or more pieces/fragments of data that can be stored in different data sources. When a request for the object is initiated, a search for those pieces/fragments of data can be performed. Nodes associated with each data source may generate data queries appropriate for its corresponding data source, retrieve, and if needed transform the data into an object-based data structure. Any pieces/fragments of data that have been discovered and retrieved can be joined, e.g., by an application programming interface server, and forwarded to a requesting client or application. In this way, only data relevant to the object is obtained. Moreover, object versioning can be employed so that the most up-to-date data is obtained.

20 Claims, 6 Drawing Sheets

(51) Int. Cl.
*G06F 16/23* (2019.01)
*G06F 16/2458* (2019.01)

(56) References Cited

U.S. PATENT DOCUMENTS

| | | | |
|---|---|---|---|
| 6,434,619 B1 | 8/2002 | Lim et al. | |
| 6,658,533 B1 | 12/2003 | Bogin et al. | |
| 7,734,643 B1* | 6/2010 | Waterhouse | G06F 16/10 |
| | | | 707/770 |
| 7,788,238 B2* | 8/2010 | Gabriel | G06Q 10/10 |
| | | | 707/695 |
| 8,112,262 B1 | 2/2012 | Michelsen | |
| 8,266,122 B1* | 9/2012 | Newcombe | G06F 16/80 |
| | | | 707/695 |
| 8,572,129 B1 | 10/2013 | Lee et al. | |
| 8,700,620 B1 | 4/2014 | Lieberman | |
| 8,713,046 B2* | 4/2014 | Vishnoi | G06F 16/2343 |
| | | | 707/770 |
| 8,751,466 B1 | 6/2014 | Tsay | |
| 8,954,553 B1 | 2/2015 | Colton et al. | |
| 8,976,955 B2 | 3/2015 | Liberman Ben-Ami et al. | |
| 9,710,512 B2 | 7/2017 | Foebel et al. | |
| 9,727,314 B2 | 8/2017 | Michelsen et al. | |
| 9,753,744 B1 | 9/2017 | Wells et al. | |
| 9,760,606 B1 | 9/2017 | Wilczynski et al. | |
| 10,152,306 B2 | 12/2018 | Ryan et al. | |
| 2004/0093344 A1 | 5/2004 | Berger et al. | |
| 2005/0172306 A1 | 8/2005 | Agarwal et al. | |
| 2006/0122982 A1 | 6/2006 | Krishnaprasad | |
| 2008/0189360 A1 | 8/2008 | Kiley et al. | |
| 2008/0209451 A1 | 8/2008 | Michels et al. | |
| 2008/0307523 A1 | 12/2008 | Subramanyam et al. | |
| 2008/0313660 A1 | 12/2008 | Malik et al. | |
| 2009/0077094 A1 | 3/2009 | Bodain | |
| 2010/0057815 A1 | 3/2010 | Spivack et al. | |
| 2011/0145689 A1 | 6/2011 | Campbell et al. | |
| 2011/0196855 A1 | 8/2011 | Wablae et al. | |
| 2011/0282919 A1 | 11/2011 | Sweeney et al. | |
| 2011/0320019 A1 | 12/2011 | Lanciani et al. | |
| 2013/0136253 A1 | 5/2013 | Liberman Ben-Ami et al. | |
| 2013/0218919 A1* | 8/2013 | Solonchev | G06F 16/958 |
| | | | 707/758 |
| 2014/0164315 A1* | 6/2014 | Golshan | G06F 16/93 |
| | | | 707/608 |
| 2015/0150094 A1 | 5/2015 | Foebel et al. | |
| 2015/0254124 A1 | 9/2015 | Berg et al. | |
| 2015/0331465 A1* | 11/2015 | Slik | G06F 1/28 |
| | | | 713/300 |
| 2015/0363492 A1 | 12/2015 | Laredo et al. | |
| 2016/0063008 A1* | 3/2016 | Benight | G06F 16/164 |
| | | | 707/694 |
| 2016/0094670 A1 | 3/2016 | Garcia Manchado | |
| 2016/0112262 A1 | 4/2016 | Johnson et al. | |
| 2016/0203138 A1 | 7/2016 | Feldschuh | |
| 2016/0203453 A1 | 7/2016 | Ito et al. | |
| 2016/0275158 A1 | 9/2016 | Baset et al. | |
| 2016/0285957 A1 | 9/2016 | Haserodt et al. | |
| 2016/0359989 A1 | 12/2016 | Aycock | |
| 2016/0378439 A1 | 12/2016 | Straub et al. | |
| 2017/0004506 A1 | 1/2017 | Steinman et al. | |
| 2017/0026393 A1 | 1/2017 | Walsh | |
| 2017/0034023 A1 | 2/2017 | Nickolov et al. | |
| 2017/0046134 A1 | 2/2017 | Straub | |
| 2017/0046235 A1 | 2/2017 | Straub et al. | |
| 2017/0048215 A1 | 2/2017 | Straub | |
| 2017/0048252 A1 | 2/2017 | Straub et al. | |
| 2017/0048319 A1 | 2/2017 | Straub | |
| 2017/0048339 A1 | 2/2017 | Straub | |
| 2017/0083378 A1 | 3/2017 | Bishop et al. | |
| 2017/0083386 A1 | 3/2017 | Wing et al. | |
| 2017/0091680 A1 | 3/2017 | Rosenthal et al. | |
| 2017/0228253 A1 | 8/2017 | Layman et al. | |
| 2017/0262852 A1 | 9/2017 | Florimond et al. | |
| 2017/0364569 A1 | 12/2017 | Jacob et al. | |
| 2018/0129485 A1 | 5/2018 | Ryan et al. | |
| 2018/0173800 A1 | 6/2018 | Chang et al. | |

OTHER PUBLICATIONS

D'Aquin; Sabou, Marta and Motta, Enrico (2006). Modularization: a key for the dynamic selection of relevant knowledge components. In: 1st International Workshop on Modular Ontologies, WoMO'06, Nov. 5, 2006, Athens, Georgia, USA.

Doran et al. "Ontology module extraction for ontology reuse: an ontology engineering perspective." In: Proceedings of the sixteenth ACM conference on Conference on information and knowledge management;(CIKM '07). ACM, New York, NY, USA, 61-70. (Year: 2007).

Doran, "Ontology Modularization Principles and Practice", Oct. 2009.

Garcia et al., "A Matchmaking Algorithm for Resource Discovery in Multi-user Settings," 2014 IEEE/WIC/ACM International Joint Conferences on Web Intelligence (WI) and Intelligent Agent Technologies (IAT) Year: 2014, vol. 3, pp. 352-359.

Jimenez-Ruiz et al. "Safe and Economic Re-Use of Ontologies: A Logic-Based Methodology and Tool Support", Technical Report, Nov. 5, 2008.

Jimenez-Ruiz, Ernesto et al. "ProSE: A Protege plugin for Reusing Ontologies, Safe and Economique User Manual." (2008).

Lin et al., "PRADA: Prioritized Random Access with Dynamic Access Barring for MTC in 3GPP LTE-A Networks," IEEE Transactions on Vehicular Technology Year: 2014, vol. 63, Issue 5, pp. 2467-2472.

Lozano et al., "Ontology View Extraction: an approach based on ontological meta-properties", 2014 IEEE.

Michael Ettredge et al., Using web-based search data to predict macroeconomic statistics, 2005, [Retrieved on Jun. 27, 2018], Retrieved from the internet: <URL: https://dl.acm.org/citation.cfm?id=1096010> 6 Pages (87-92) (Year: 2005).

Na et al., "Design of Location-based Directory Facilitator in Context-Aware Environment," 2008 10th International Conference on Advanced Communication Technology Year: 2008, vol. 3, pp. 2107-2110.

Notice of Allowance for U.S. Appl. No. 15/364,131 dated May 8, 2017.

Notice of Allowance for U.S. Appl. No. 15/730,646 dated Aug. 7, 2018.

Noy et al., "Traversing Ontologies to Extract Views", from book Modular Ontologies: Concepts, Theories and Techniques for Knowledge Modularization (pp. 245-260), Jan. 2009.

Official Communication for European Patent Application No. 17195027.2 dated Nov. 30, 2017.

Official Communication for U.S. Appl. No. 15/364,131 dated Feb. 7, 2017.

Official Communication for U.S. Appl. No. 15/459,843 dated Nov. 15, 2017.

Official Communication for U.S. Appl. No. 15/459,843 dated Jun. 23, 2017.

Official Communication for U.S. Appl. No. 15/459,843 dated Aug. 9, 2017.

Official Communication for U.S. Appl. No. 15/730,646 dated Dec. 4, 2017.

Official Communication for U.S. Appl. No. 15/459,843 dated Nov. 23, 2018.

Official Communication for U.S. Appl. No. 15/459,843 dated Jun. 12, 2018.

Official Communication for U.S. Appl. No. 15/730,646 dated Mar. 1, 2018.

Official Communication for U.S. Appl. No. 16/213,936 dated Jan. 23, 2019.

Ye Hui-min et al., Design and Implementation of On-Line Hot Topic Discovery Model, 2006, [Retrieved on Jun. 27, 2018], Retrieved from the internet: <URL: https://link.springer.com/content/pdf/10.1007%2FBF02831697.pdf> 6 Pages (21-26) (Year: 2006).

* cited by examiner

SYSTEM AND METHODS FOR OBJECT VERSION TRACKING AND READ-TIME/WRITE-TIME DATA FEDERATION

CROSS REFERENCE TO RELATED APPLICATIONS

This application claims the benefit under 35 U.S.C. § 119(e) of U.S. Provisional Application Ser. No. 62/596,673, filed Dec. 8, 2017, the content of which is incorporated by reference in its entirety into the present disclosure.

TECHNICAL FIELD

This disclosure relates to approaches for object version tracking and object fragment procurement from federated data sources.

DESCRIPTION OF RELATED ART

Platforms allow for data analysis. The data to be analyzed may be obtained from many disparate data sources, and in some instances, the data may be ingested into one or more object-based data models that are supported by the data analysis platform. Users can interact with the data analysis platform using a workspace through which various operations or workflows for accessing and manipulating data may be utilized. Because the data can be obtained from disparate data sources, the data must be federated in order to allow users to retrieve data from the disparate data sources with a single query. However, conventional approaches to creating a federated database involves downloading or ingesting all the data stored in each of the disparate data sources onto the platform (or database associated with the platform). This approach becomes unfeasible when the amount of data exceeds the storage capacity of the platform/platform database.

SUMMARY

One embodiment of the present disclosure provides a system for analyzing data, comprising: one or more processors; and a memory storing instructions that, when executed by the one or more processors, cause the system to: receive a request for an object in accordance with a data analysis procedure; retrieve two or more data fragments making up or associated with the requested object, wherein each of the two or more data fragments are stored in different data stores, and wherein each of the different data stores are operatively connected to adapter nodes configured to retrieve the two or more data fragments from the respective data stores by identifying the two or more data fragments from an object ID included in the request and determining an appropriate query to search for the two or more data fragments from each of the data stores; upon retrieval of the two or more data fragments, join the two or more data fragments to create a canonical view of the object; and transmit the canonical view of the object to an application from which the request was received.

In some embodiments, the system further comprises a data analysis platform through which a user of the application performs at least one of an editing procedure, a resolution procedure, and a tagging procedure related to the object.

In some embodiments, the data analysis platform comprises a database storing a third data fragment of the two or more data fragments. In some embodiments, the data analysis platform comprises a persistent cache implementing a smart versioning function to maintain a most up-to-date version of the third data fragment.

In some embodiments, the instructions further cause the system to query the persistent cache of the data analysis platform prior to querying the data analysis platform. In some embodiments, a first of the two or more data fragments comprises a different type of data that a second of the two or more data fragments. In some embodiments, at least one of the data stores maintains a corresponding one of the two or data fragments in a tabular format.

In some embodiments, a corresponding one of the adapter nodes associated with the at least one of the data stores transforms the corresponding one of the two or more data fragments from the tabular format to an object-based data structure.

In some embodiments, each of the adapter nodes comprises or is operatively connected to a data crawler configured to determine a query format appropriate for querying a corresponding data store.

In some embodiments, the instructions further cause the system to provide one or more application programming interfaces allowing the application to operatively communicate with the data stores. In some embodiments, the instructions causing the system to join the two or more data fragments further causes the system to append an ID identifying the object to each of the two or more data fragments within the corresponding data stores. In some embodiments, the instructions cause the system to retrieve the two or more data fragments only at a read-time or write-time operation at the application.

In some embodiments, each of the adapter nodes comprises a persistent cache implementing a smart versioning function to maintain a most up-to-date version of each of the two or more data fragments. In some embodiments, the instructions further cause the system to query the persistent caches of each of the adapter nodes prior to querying the corresponding data stores.

Also provided, in one embodiment, is a method being implemented by a computing system including one or more physical processors and storage media storing machine-readable instructions, the method comprising: receiving a request for an object in accordance with a data analysis procedure; receiving, at one of a read-time or write-time operation of the data analysis procedure, data associated with the object, the data comprising two or more data fragments, wherein each of the two or more data fragments are stored in different data stores, and wherein the two or more data fragments have been joined to create a canonical view of the object.

In some embodiments, the method further comprises formulating queries for the two or more data fragments in accordance with the respective data stores from which the two or more data fragments originate. In some embodiments, the method further comprises transforming each of the two or more data fragments from a first data format into an object-based data structure commensurate with that associated with the data analysis procedure. In some embodiments, the joining of the two or more data fragments comprises appending an ID identifying the object to each of the two or more data fragments within the corresponding data stores. In some embodiments, the method further comprises querying smart versioning caches associated with each of the data stores prior to querying the data stores to obtain, if present in the smart versioning caches, the two or more data fragments. In some embodiments, the method further comprises receiving, a third data fragment associated with the object based upon querying a data analysis platform, and wherein the third data fragment is joined with the two or more data fragments obtained from the data stores to create the canonical view of the object.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Overview

A claimed solution rooted in computer technology overcomes problems specifically arising in the realm of computer technology. In various implementations, a computing system may include a plurality of data sources as well as a data analysis platform that may itself store data. The computing system may further include adapter nodes operatively connected to each data source serving as an intermediary between each data source and an application programming interface (API) server. The API server is operatively connected to a client device running a front-end application which a user may employ to interact with the data analysis platform, receive and view data, etc.

Each data source may store some portion or piece of data ("fragment") related to an object. For example, different types of data associated with an object may be stored at each data source. Data at each data source may be tagged with an ID that correlates the different types of data stored at each data source with the object. As used herein, the term fragment can refer to any "portion" or data subset of some object.

A request, in which an object ID is specified, to access any available data associated with the object may be received from the front-end application. Each adapter node associated with each data source employs a "crawler" to find data associated with the ID. The crawler determines how to properly query its respective data source and proceeds with the query. Some adapter nodes may include a cache to hold data for a data source that may be deemed to be important or more likely to be accessed. The cache may be a persistent cache, and can employ smart versioning to ensure the most up-to-date data is used. In the event the crawler has not completed the query, a notification can be sent to the front-end application indicating the status of the query. In some embodiments, a partial object view can be presented through the front-end application.

Upon obtaining data associated with the object, the API server may join the data and forward the data to the front-end application.

In this way, the issue of reading/ingesting an entire data source can be avoided. Additionally, the issue of not knowing which data source to read/ingest data from is avoided. Moreover, less data can be stored at the platform, thereby reserving resources, speeding up processing, etc.

Object-Based Data Structure

Before describing the systems and methods for federating data in accordance with various embodiments of the present disclosure, it is useful to describe an example object-based data structure that can be used to represent subjects/data to be analyzed by the systems and methods disclosed herein.

In some implementations, the disclosed technologies may facilitate a data transformation between a tabular data structure and an object-based data structure. Object-based data structures may provide powerful tools for generating insights about data and links between data. For example, systems may collect data in a tabular format comprising rows and columns populated with data. Transforming tabular data into object-based data may be necessary to access the insights available through an object-based data representation including, but not limited to, e.g., link maps, histograms, timeline representations, etc.

Figure 1:
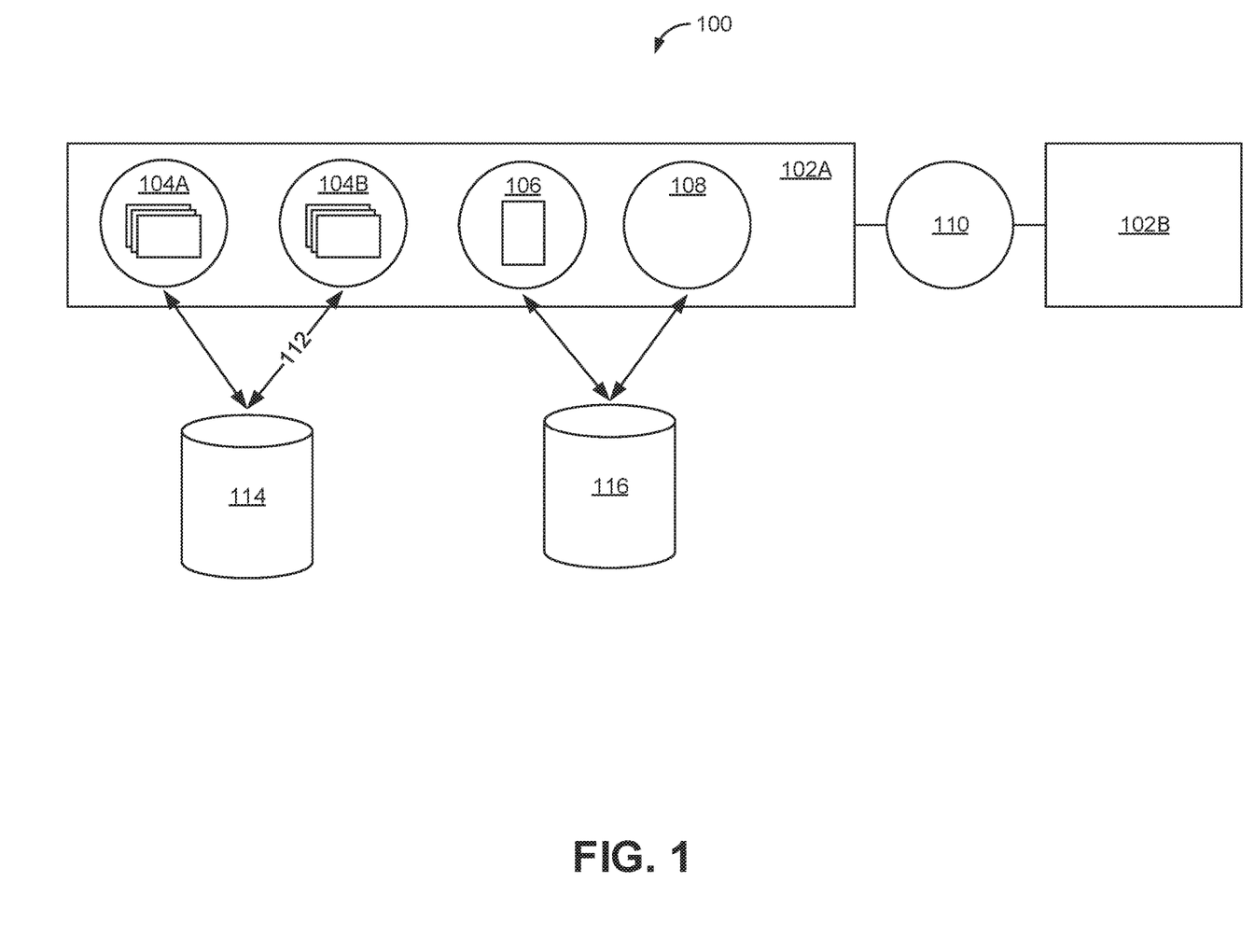
FIG. 1 illustrates an example object-based data structure.

FIG. 1 depicts an object-based data structure 100. Object-based data structure 100 can be centered around data objects, e.g., data objects 102A and 102B. Each data object 102A/102B may include several components, including one or more object properties 104A/104B, one or more data notes 106, one or more media components 108, and/or one or more data links 110. The origin of data stored in data object 102A, for example, may be stored in a data source record 112 that indicates a data source 114 of the stored data. Other components or "fragments" of data that make up the data object 102A, e.g., data notes 106, media components 108, etc., may originate at another data source, e.g., data source 116.

The object model is a framework for how data is stored. The object model is further defined by an ontology, defining the types of data and how they are stored in a given system. The ontology may be dynamic, and updated to match evolving needs of the system and analysts analyzing data with the system. The ontology may define types of data objects, e.g., data objects 102A and 102B, object properties 104A/104B of a particular data object, e.g., data object 102A, and data links 110 associated with a data object, e.g., the link between data object 102A and data object 102B. The ontology may further define which data types may be associated with each other. Each data type may have a URI (uniform resource identifier) that identifies it.

Object types define the kinds of things that may be represented in the system, and provide a structure for data objects. Object types may be derived from, for example, entity types, event types, document types, and multimedia types. Event and document types may have temporal and geospatial data directly included within the data object itself. An object type may define the number and composition of properties, e.g., object properties 104A/104B, data notes 106, and media components 108 of a data object, e.g., data object 102A. The object type may further define what other types of objects that data links, e.g., data link 110, may permit association with. For example, an entity's object type may define a data object 102A used to store data about a person, and may include data properties 104A/104B for storing name, address, occupation, e-mail address, phone number, etc. Data links 110 of an entity object 102A may permit the entity object 102A to be linked to other entity objects (e.g., friends or business associates), linked to event objects (e.g., events attended or invited to), linked to document objects (e.g., authored), etc., e.g., object 102B.

Property types may define the type and behavior of input data. Property types may define the structure of the data stored in an object property, e.g., object property 104A. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL USERNAME with the value "john," EMAIL DOMAIN with the value "acmeinc.com." Further, the e-mail property type may define tools for parsing and concatenating the username and the domain, depending on what is required.

Link types may define the types of data links, e.g., data link 110 that can exist between two objects, e.g., objects 102A and 102B. Links may be symmetric or asymmetric. All links may have one object that is considered the "parent" object, and another object deemed to be the "child." In the case of symmetric links, e.g., "Spouse Of," parent and child objects may not necessarily be contextually important. In the case of asymmetric links, like "Manager Of/Managed By," the parent and child may reflect the direction of the link.

Thus, the ontology of an object-based data system may define the way in which data is organized in the object-based data system. The ontology defines the types of objects that may be stored and the components of the defined data objects as well as the manner in which the defined data objects may link to one another via data links.

System and Method for Data Fragment Federation

As noted above, data analysis may involve obtaining data to analyze from more than one data source. That is, a data analysis platform may access multiple, sometimes remote datastores, data servers, etc. in order to obtain the requisite data for analysis. For example, an analyst may wish to analyze data regarding an object, e.g., a particular person. Data about and/or associated with that person may reside in different data sources, and may take different forms, e.g., phone records regarding calls made to and/or by the person. Data regarding that person may also exist in the form of personal data, e.g., social security number (SSN) information associated with the person. The phone records and personal information, although associated with the same person may be stored or maintained in different data stores. In order to provide meaningful analysis, both sets of data should be made available to the analyst.

However, conventional data platforms would generally require downloading, importing, or otherwise being provided access to the entirety of each data source in order to allow the analyst to search for each type of data. Accordingly, data analysis based on this type of data federation can result in unnecessary delays. Moreover, data analysis platforms may not have the ability or capacity to handle the voluminous amounts of data that could exist in these data sources. For example, some data analysis platforms can handle hundreds of millions of objects, but still, some data sources contain amounts of data that exceed this capacity.

Figure 2:
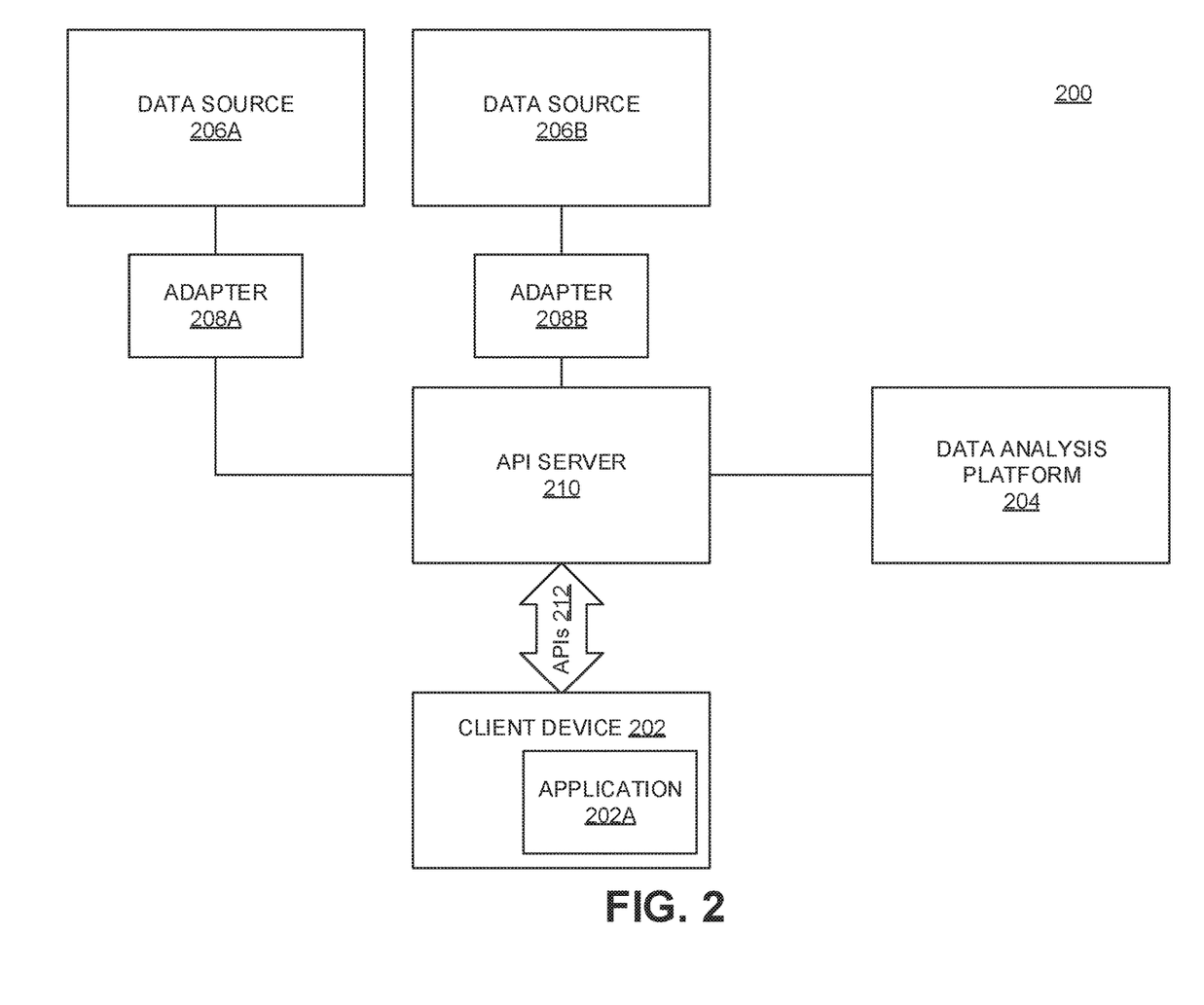
FIG. 2 illustrates a schematic representation of an example multi-data source system for object versioning, tracking, and data federation in accordance with one embodiment of the present disclosure.

FIG. 1 is a schematic representation of an example data analysis system 200. In data analysis system 200, user, e.g., an analyst, may analyze data using a data analysis application 202A running or implemented on a client computing device 202. The client computing device may be any client computer such as a workstation computer, a laptop computer, a tablet computer, a mobile phone, or other client computing device that has or is operatively coupled to a display, e.g., a video/multimedia display. While only a single client computing device 202 is shown in FIG. 1, the system 100 may include more client computing devices. Any one or more of the links represented between the elements of data analysis system 100 may traverse one or more data networks (e.g., Local Area Networks and Wide Area Networks).

A network communication link may be based on a reliable network transport protocol such as TCP/IP or the like. A network communication link, e.g., between client computing device 202 and another system element, e.g., API server 210, data analysis platform 204, etc. may be established as and when needed, for example, when the API server 210 or client computing device 202 needs to send data to the other. Alternatively, a network communication link may span the life of a session during which data is sent back and forth between the system elements in multiple communication exchanges. Network communication links may traverse a number of intermediary devices (e.g., web servers, cache servers, proxy servers, content delivery network servers, etc.) not necessarily shown in FIG. 1. Communications, data exchange, etc. between any one or more of the system elements may involve standardized Web protocols (e.g., HTTP, HTTPS, etc.) and include standardized markup language instructions (e.g., XML, HTML, XHTML, etc.), standardized style sheet language instructions (e.g., CSS, etc.), and standardized client-side scripting language instructions (e.g., JavaScript®, ActionScript®, and Jscript®, etc.).

In some embodiments, the client device 202 may be a computer workstation running a web-based application 202A that is an instance of data analysis platform 206. In some embodiments, the client device 202 may be some other computing or processing device running a standalone instance of application 202A that needs to access data analysis platform 204. That is, data analysis platform 204 may have its own dataset or corpus of data that, e.g., another user analyzed, and which the user of client device 202/application 202A wishes to access and/or leverage for his/her own data analysis.

Data analysis platform 204 may be or may include a database that maintains an immutable log or record of an object along with the attributes regarding those objects. Any addition, modification, or deletion of an attribute associated with an object can be recorded, along with data regarding the use that added, modified, or deleted the attribute, the security level of that user, where the data is sourced to, tags, metadata, etc. Data analysis platform 204 may also provide various forms of analytical functions, such as filtering, visualizing, mapping, sharing, controlling access to data, etc. Thus, an analyst, by way of application 202A may wish to access and/or use data analysis platform 204 for its functionality and/or to obtain access to data generated and stored therein.

Data analysis system 200, as illustrated in FIG. 2, further includes two data sources, data source 206A and 206B. Following the above example, data source 206A may be a database containing phone records for a particular region, carrier, etc. Data source 206A may be a data repository associated with a particular information provider or other entity in possession of phone records data. Data source 206B may be a database containing personal records associated with persons residing/thought to reside in a particular region. Data source 206B may be a data containing personal records associated with an information provider having a need or the authority to maintain personal records regarding certain persons.

It should be understood that data analysis system 200 may include more than two data sources, or may contain a single data source along with data analysis platform 204, as needed/desired. The size and/or number of data sources comprising data analysis system 200 can change depending on the subject(s) of interest and/or the analysis needs of a particular analyst. For example, one analyst may choose to limit his/her search for a subject of interest to a particular number/type of data sources, while another analyst may choose to analyze data that may fragmented across many more data sources. As another example, the same analyst, may, depending on the needs of his/her search may seek to access data stored in more, less, and/or other data sources.

Here, data source 206A and data source 206B may both contain data associated with an object, i.e., the aforementioned person. It may be that data sources 206A and 206B have data tagged or associated with "external" IDs that match. For example, data source 206A may be a phone records database that has a record of calls made or received by the person, while data source 206B may be a personal records database that has personal records regarding the same person. Data sources 206A and 206B may have their respective data tagged with an ID, such as the person's name, resulting in the aforementioned match. In some cases, data sources 206A and 206B may have data tagged or associated with an ID that comprises the data stored in the other data source. For example, data source 206A may have records tagged with a callee's phone number, while data source 206B has, as part of the personal records associated with the person, his/her phone number. If data is being "pushed" to data analysis platform 204, data analysis platform may be able to run an integration to join the phone records and personal records data. That is, metadata from data sources 206A and 206B can be used to join the two types of object data from the respective data sources to create a canonical view of an object that has object data from both data sources, e.g., a single "person" object that has personal records information and phone call information associated with it.

However, if an analyst using application 202A wishes to find data associated with the person, finding the data and joining the data is not a trivial task, unless the entire corpus of data stored in data sources 206A and 206B are ingested by data analysis platform 204, which the analyst may then search. In other words, looking for data fragments "in the reverse" is difficult if not impossible using conventional techniques.

For example, the analyst may just inquire or perform a search using an ID, e.g., the person's name. Finding any and/or all data fragments across data sources 206A/206B and data analysis platform 204 is no longer possible, or at least would be an extremely time-intensive process. The process could involve sifting through huge amounts of data, the majority of which may be irrelevant. Even if multiple, federated data sources were accessed without obtaining the entire corpus of data, the process would nevertheless require accessing and querying against the entirety of the data source to see if data that matches the query (e.g., ID) exists in any/all records. In other words, a data source may not know whether or not it has any relevant data. For example, the ID used by the analyst may not be specific enough to be used by the data source to look for relevant data. Rather, it would be useful to, at read/write time, i.e., when needed, to access/obtain only the relevant data across a plurality of data sources to create a canonical view of an object.

Accordingly, various embodiments can implement metadata and version tracking of data sources, such as data sources 206A/206B and data analysis platform 204. Tracking of fragments can be performed over time so if a data source, e.g., data source 206A gets updated with a new version of an object's fragment, data analysis system 200 can run a re-ingestion of that object's updated data fragment.

In order to achieve the object version tracking and read/write time accessing or ingestion of (only) fragments, data analysis system 200 leverages adapters or "nodes" that can be associated with each data source. For example, in FIG. 2, data analysis system 200 may include adapter 208A associated with data source 206A and adapter 208B associated with data source 206B. In some embodiments, one or more adapters can be used in conjunction with the data analysis platform 204. These adapters can be used to transform data from a data source, e.g., if the data is in some tabular format (which is common), into an object-based data structure that can be more readily analyzed and/or allow for more/better ways to consume the data. Consider, for example, an analyst is performing a search for an object that is associated with one or more data fragments stored in data source 206A. Prior to reaching client device 202/application 202A, the one or more data fragments, at read/write time, can be transformed if needed by adapter 208A into an object-based data structure. The data transformation functionality of adapters 208A and 208B is discussed in greater detail below.

Moreover, these adapters, e.g., adapters 208A and 208B, can be configured to perform the aforementioned data fragment version tracking. That is, adapters 208A and 208B may implement caches. The caches may be persistent caches that use smart versioning to ensure the most up-to-date data is used. Further still, data stored in data sources 206A and 206B (as described above) may be phone records and personal records stored in tabular form, e.g., as a collection of rows of data, where each row contains some properties for an object, and where that row may comprise a data fragment. These data fragments can augmented with the attachment of ontological notations, object data can be cleaned, etc.

Further still, adapters 208A and 208B implement "crawlers" to find match(es) based on the specified object vis-à-vis the aforementioned ID. In some embodiments, crawlers can be implemented elsewhere, e.g., a corporate firewall, or other system element(s). In effect, the crawlers can be configured to determine how, based on the type of data stored in the associated data source and/or the type of data source, relevant data could be searched for. That is, the crawler determines and forms the appropriate query to obtain any data fragment(s) if they exist in the data source. In the event a crawler has not completed a query, a notification can be sent to application 202A, for example, indicating the status of the query. In some embodiments, a partial object view can be presented through application 202A. It should be noted that more robust caches and/or adapter implementations can be used at data sources that, e.g., over time, have been observed as being heavily accessed in data analysis system 200. Further still, an adapter can be taken offline, or a new adapter can be implemented relative to a data source without impacting the rest of data analysis system 200.

It should be noted that transforming a data fragment from tabular form to an object-based data structure is only one example of a transformation contemplated in accordance with various embodiments. That is, the adapters can be configured to perform any requisite transformations, if needed, to achieve the data format needed by application 202A and/or data analysis platform 204.

It should also be noted that in some embodiments, e.g., when application 202A is accessing or is running as an instance of data analysis platform 204, data analysis platform 204 may ingest the one or more data fragments (post-transformation if needed). The resulting objects may then be used by application 202A.

Once the requisite data fragments are obtained, e.g., from data sources 206A and 206B, in order to achieve the aforementioned canonical view of the object, the data fragments are joined. In data analysis system 200, this joining of data fragments can be performed by API server 210. The joining of data fragments can include, in some embodiments, the association of an ID with those data fragments in each data source from which the data fragments originated. For example, a search for a person, e.g., person handle="ash," a unique ID, e.g., "778" that can be used for generating an identifier can be associated with each data fragment found/identified from, e.g., data source 206A and data source 206B.

In operation, an analyst may find relevant information regarding the person, and the analyst can create and send a link to this information to another analyst, e.g., http://system/obj/ash778. This may be "placed" by the other analyst on a map visualization generated using data analysis platform 204, or the other analyst may simply access the link to view the information. Upon accessing the link, a search for all information regarding ash778 is performed by querying data sources 206A/206B and/or data analysis platform 204 to determine if any fragments exist. Adapters 208A/208B can transform any identified fragments, API server 210 may join the fragments, and the object can be sent to this other analyst. Again, judicious use of caches (e.g., at data sources that have/are predicted to be more frequently queries) response time/query results can be obtained more quickly. That is, if data source 206B is identified to be such a data source, a cache can be used to pre-load (smart versioned) fragments associated with the object ash778 to be sent each time a query for that object is initiated. In some embodiments, API server 210 may also be configured have a cache layer that can mirror the functionality of those caches implemented in/associated with data sources 206A/206B. In other embodiments, data analysis platform 204 may also maintain tables, for example, that track which data fragments are associated with which object and their origin, e.g., which data source they originated from.

It should be noted that the amount of data that persists on adapters 208A/208B can be relatively small (e.g., a single string and data locator). By keeping the amount of data small, it can be easier to scale. Moreover, data stored on data analysis platform 204, in some embodiments, may be made immutable to again, increase response time.

It should also be noted that if an analyst wants to search a particular data source, e.g., data source 206A for particular data, an option can be given to search for other fragments in other data sources, e.g., data source 206B. For example, search results may include phone records with additional information, e.g., a full object or object graph presented nearby.

Example Data Fragment Federation Method

Figure 3:
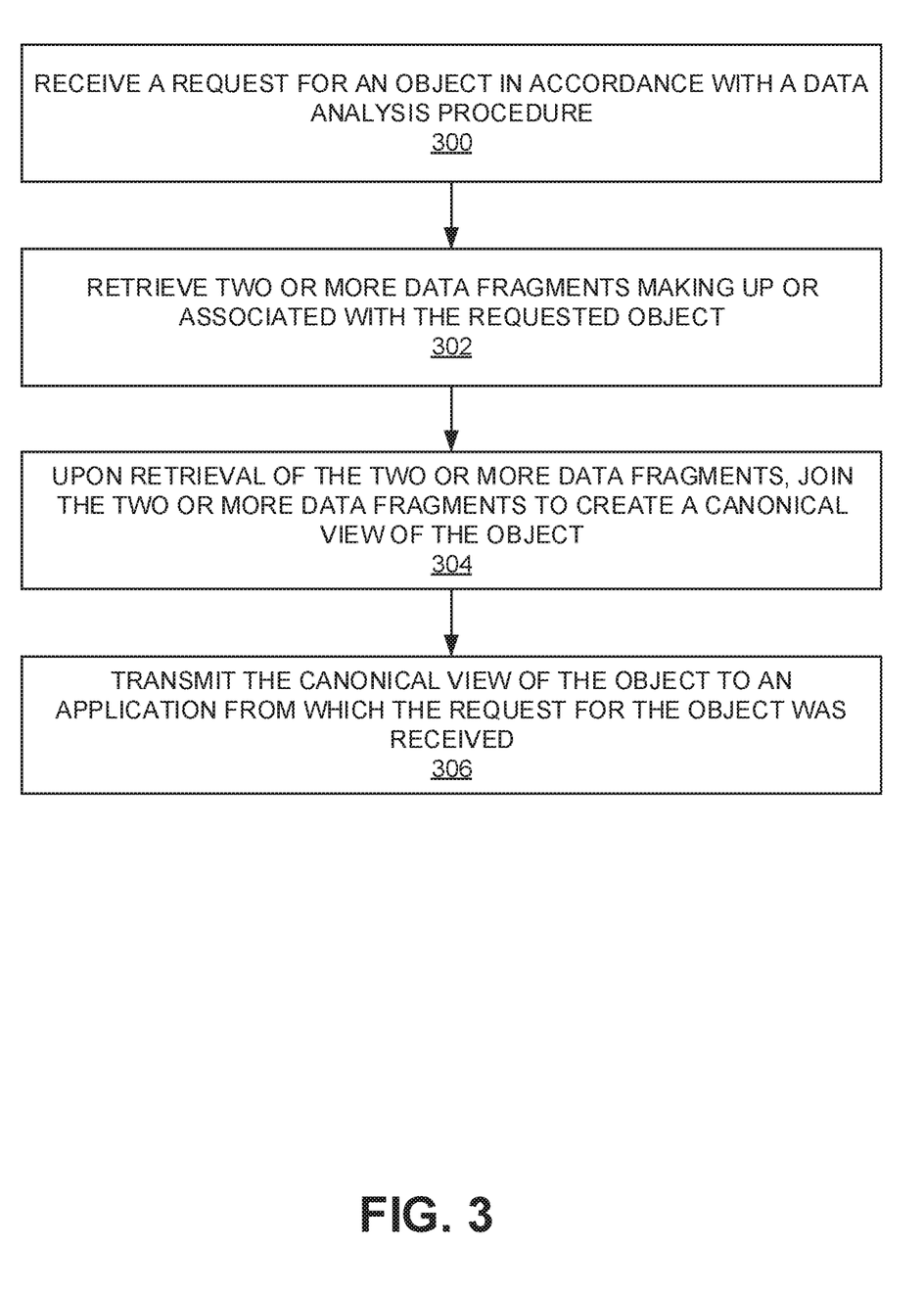
FIG. 3 is a flow chart of example operations that can be performed for achieving the object versioning, tracking, and data federation in the system of FIG. 2.

FIG. 3 is a flow chart of example operations that can be performed for achieving the object versioning, tracking, and data federation in the system of FIG. 2. At operation 300, a request for an object of a data analysis procedure may be received. For example, an analyst using application 202A may initiate a query for a particular object of interest using some identifier or ID value.

At operation 302, two or more data fragments making up or that are associated with the object are retrieved. For example, as described herein, the query can be initiated, at which point, adapters 208A and 208B determine and generate an appropriate query commensurate with the data stored in data sources 206A and 206B, respectively, and/or commensurate with the type of data source data sources 206A and 206B may be. Thereafter, the queries can be executed on data sources 206A/206B via crawlers. The query can be applied to data maintained within data analysis platform 204. In some embodiments, one or more of these elements may employ caches that may have the requisite data fragments pre-identified/stored therein to allow for faster query response time. Moreover, the caches may keep updated versions of the data fragments.

At operation 304, upon retrieval of the two or more data fragments, the two or more data fragments are joined to create a canonical view of the object. For example, API server 210, after providing the requisite APIs to application 202A allowing it to communicate with data sources 206A/206B and/or data analysis platform 204, API server 210 may join the data fragments by associating the data fragments to the object vis-à-vis an ID.

At operation 306, the canonical view of the object can be transmitted to an application from which the request for the object was received, in this example, application 202A.

Data Transformation

A data-analysis platform, such as data analysis platform 204, may support an object-based data modeling framework, as described above. As also described above, data is frequently collected in a tabular format. Importing tabular formatted data into an object-based data modeling platform may require applying the ontology of the object-based data platform to a tabular dataset to transform the tabular dataset into data that conforms as required for the object-based data modeling platform.

Figure 4:
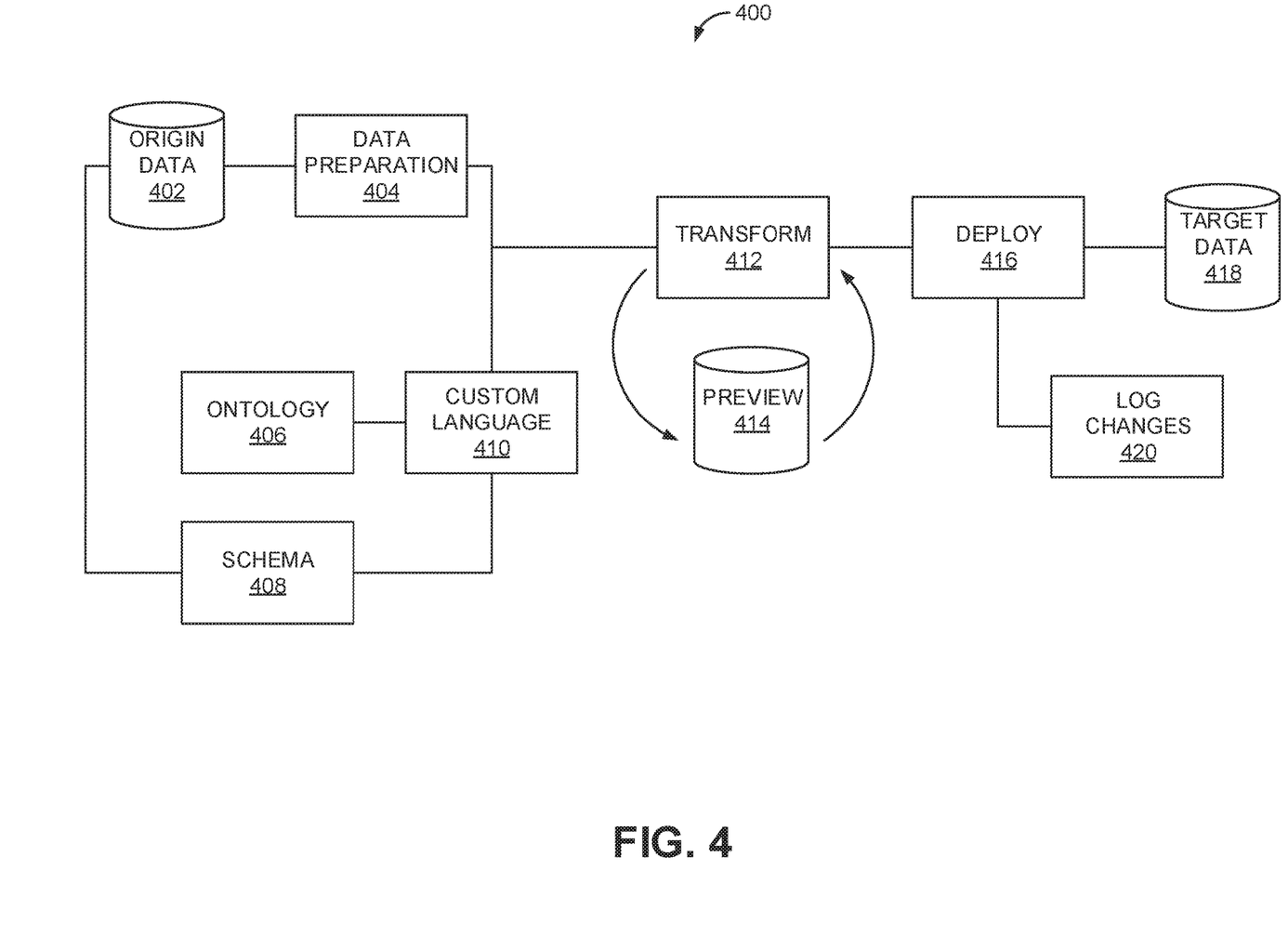
FIG. 4 illustrates an example process for data transformation in accordance with one embodiment of the present disclosure.

FIG. 4 depicts a process flow 400 of a data transformation process, according to some embodiments, that can be implemented in one or more adapters, e.g., adapters 208A/208B of FIG. 2. In the example illustrated in FIG. 4, origin dataset 402 is transformed into target dataset 418.

Origin dataset 402 may be organized according to an origin data schema 404. Origin data schema 404 may specify a tabular format for data of the origin dataset 402. All or a portion of a dataset stored in a tabular data module as well as the origin data schema 404 can be received for transformation. The received origin data may be stored in a local or temporary memory for action by the system. In some implementations, receiving the origin dataset 402 may include obtaining access to the origin dataset 402 in its permanent location. Origin dataset 402 may be viewed, analyzed, processed, and otherwise interacted with via a tabular data editor in a data preparation process at 408. In some implementations, a tabular data editor may be employed to clean or otherwise normalize origin dataset 408.

Target dataset ontology 406 and origin data schema 408 may be processed to generate a custom transform language during a custom transform language generation process 410. The target dataset ontology 406 may define the data objects and relations between data objects of an object based dataset. Target dataset ontology 406 may be accessed pursuant to a request, obtained, and/or otherwise acquired, e.g., from an object-based data module or in another location. All or only a portion of the ontological details defining an object-based dataset may be received/accessed. Custom transform language generation process 410 may further create a transform script template and supply the script template to a transform code editor. The cleaned origin dataset may be received by a code editor for authoring code in the custom transform language at transform script generation process 410. A user may employ the transform code editor to enter instructions in the custom transform language.

During the creation of a transform script, the transform code editor may provide several features to facilitate the generation of a transform script. In some implementations, type checking and/or error checking may be provided. As a user enters code into the transform code editor, the entered code may be checked against the origin data schema and the target dataset ontology to ensure that references to the data of the origin dataset and the target dataset ontology are entered correctly. For example, entered code may be spell checked against the origin data schema and the target dataset ontology. In another example, entered code may be type checked, e.g., to ensure that the code entered for the transform script does not attempt to store data of one type in a data field that expects a different type, simultaneous with code entry. Should a user enter transform code that violates the type system of the origin data schema and target data ontology, the entered code may be identified through highlighting, underlining, strike-through, bolding, or other action. In another example, the existence of origin data fields and target data fields may be verified during code entry. For example, if a user attempts to write transform code intended to transform data from a non-existent column of the origin data schema, the entered code may be identified as it is entered.

In some implementations, a preview of data transformation results based on the entered transform code may be provided. Transform code may be deployed across at least a portion of origin dataset 402 as the code is entered. Thus, the entered code may be compiled and deployed upon entry, without waiting for completion of the transform script. The results of the deployment may be provided as a preview target dataset 414. A user may view the preview target dataset 414 in a data viewing module suitable for viewing object based data. The user may view the preview target dataset 414 and ensure that data from the origin dataset 402 has been transformed properly to conform with the target dataset ontology 406. The user may then provide further revisions to the transform script through the transform code editor if the preview target dataset 414 appears to be in error.

After completion of the transform script, the user may choose to deploy the completed script across all or a portion of the origin dataset 402 at deployment process 416. The completed transform script may be deployed across the origin dataset 402 according to user selection of origin dataset 402 portions, according to updates to origin dataset 402, according to updates to the transform script, and/or any other suitable criteria. Deployment of the transform script may provide updates to target dataset 418. In some implementations, the entirety of a target dataset 418 may be generated according to the deployment of the transform script. In some implementations, target dataset 418 may be updated, modified, added to, subtracted from, or otherwise altered according to the transform script.

Deployment of the transform script may also be accompanied by the storage of data transformation information. Data transformation information may be stored with or in association with origin dataset 402 and target dataset 418. When stored with or in association with data objects of target dataset 418, data transformation information may include any or all of a time and date, a transform script version number, transform script code used to produce the data objects associated with the data transformation information, errors occurring during the transformation, and any additional information generated during the transformation. In some embodiments, changes may be logged at 420. That is, data transform information that includes information about, e.g., a version of compiled transform instructions used for transforming a specific portion of data and a corresponding date, can be stored. This can be used for error checking as well as determining which portion(s) of a dataset may need updating.

Various systems may be used to perform the transformation described above. One example of such a system is described in co-pending and commonly assigned U.S. patent application Ser. No. 15/383,787.

It should be noted that selections of origin dataset 402 to be transformed may be selected according to data transformation information stored about previous data transformations, for example, transformation times and dates, and transform scripts used to execute the transforms.

Serving an Application from Multiple Data Sources

As previously noted, data that is to be analyzed can come from different data sources. In accordance with various embodiments, APIs can be provided that allow users to interact with the data analysis platform. As illustrated in FIG. 2, APIs, e.g., APIs 212, can be provided via API server 210. Data analysis platform 204 may also be configured to implement various modularized services through which operations for accessing and manipulating data can be performed. Such operations can allow for querying data as well as accessing and manipulating object graphs. Data analysis platform 204 may also be configured to implement various plugins that extend its functionality. One example plugin can allow data analysis platform 204 to access and ingest new data sources on which various operations will be performed. In one example, data analysis platform 204 may be implemented as a web server. Users can develop web applications that can run on the web server and can utilize the various integrations that have been configured through the web server. In another example, a plugin (e.g., an embedded web server) that implements some, or all, of the features of the web server can be installed in a workspace client. In this example, any web applications that were developed can be executed on the stand-alone workspace client.

This framework may include a set(s) of application programming interfaces (APIs) across multiple serving components. The usage of consistent APIs across multiple serving components may allow for implementation of modularized services though which operations for accessing and manipulating data may be performed. APIs may provide a mechanism by which applications, e.g., application 202A may communicate one or more of data sources 206A/206B. APIs may include one or more sets of routines, protocols, and tools for building web applications. APIs may specify how application 202A communicates with other elements of data analysis system 200. APIs may be modular and individually comprehensive packages for common data operations, such as data read, data write, data search, data tag, data promotion, and/or other operations. APIs may include operations on object graphs.

APIs may include HTTP/JSON APIs that provide functionalities for processing data. For example, APIs may provide functionalities for loading, storing, editing, searching, and/or otherwise interacting with data. APIs may allow for applications to make API calls, which may specify one or more actions, one or more parameters, and/or one or more values for interacting with data. In some implementations, one or more web applications may communicate with other web applications via APIs.

Data sources 206A/206B may include one or more services that may be used by application 202A via APIs. Services may refer to functionalities provided by a data source for viewing, creating, and/or editing data stored therein. Services provided data sources 206A/206B may allow for users to expose data stored in data sources using the APIs.

As non-limiting examples, services may include data read, data write, data search, data tag, data promotion, and/or other services. Data read services may enable data analysis platform, 204 and/or a data source 206A/206B to read one or more data stored in data sources. Data write services may enable data analysis platform 204, and/or a data source 206A/206B to write one or more data (new or edited) to the data source 206A/206B. Data search services may enable data analysis platform 204, and/or a data source 206A/206B to find particular data therein. Data tag services may enable data analysis platform 204, and/or a data source 206A/206B to tag data with categorization information (e.g., classify certain data/segregate data into folder). Data promotion services may enable data analysis platform 204, and/or a data source 206A/206B to move data from the data source 206A/206B to data analysis platform 204.

Services offered by different components described above may be changed (e.g., expanded). For example, one or more integration services may be added. An integration service may refer to operations that allow interaction with data stored in one or more data sources. For example, application 202A may require protocols through which data source 206A communicates to provide/receive information. Integration services may be modular so that an integration service written for one particular type of data source (e.g., formatted in a particular database) may be used across applications. Other types of services are contemplated.

Figure 5:
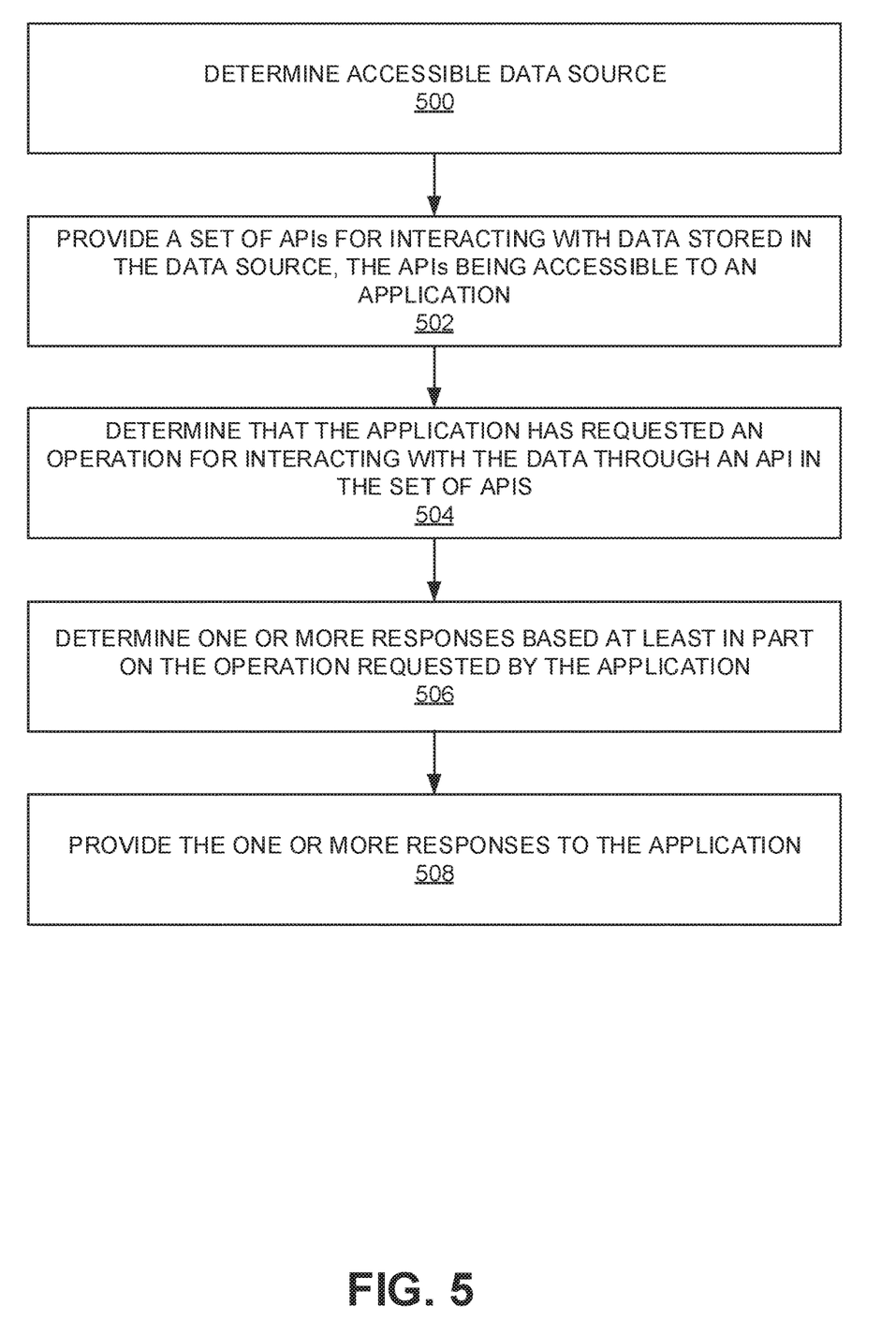
FIG. 5 is a flow chart of example operations that can be performed for serving an application requesting data from different data sources in accordance with one embodiment of the present disclosure.

FIG. 5 is a flow chart illustrating example operations that may be performed to provide the requisite APIs to allow application 202A, for example, to communicate with and ultimately join the data fragments. Referring to FIG. 5 at operation 500, a data source which is accessible may be determined. The data source may be the same as or similar to data sources 206A/208B described herein. At operation 502, a set of APIs for interacting with data stored in the data source 206A/206B may be provided. The APIs may be accessible by application 202A. At operation 504, an operation for interacting with the data may be determined. The operation may have been requested by application 202A through an API in the set of APIs. At operation 506, one or more responses may be determined at least in part on the operation requested by application 202A. At operation 508, one or more responses may be provided to application 202A.

Example Computer System

Figure 6:
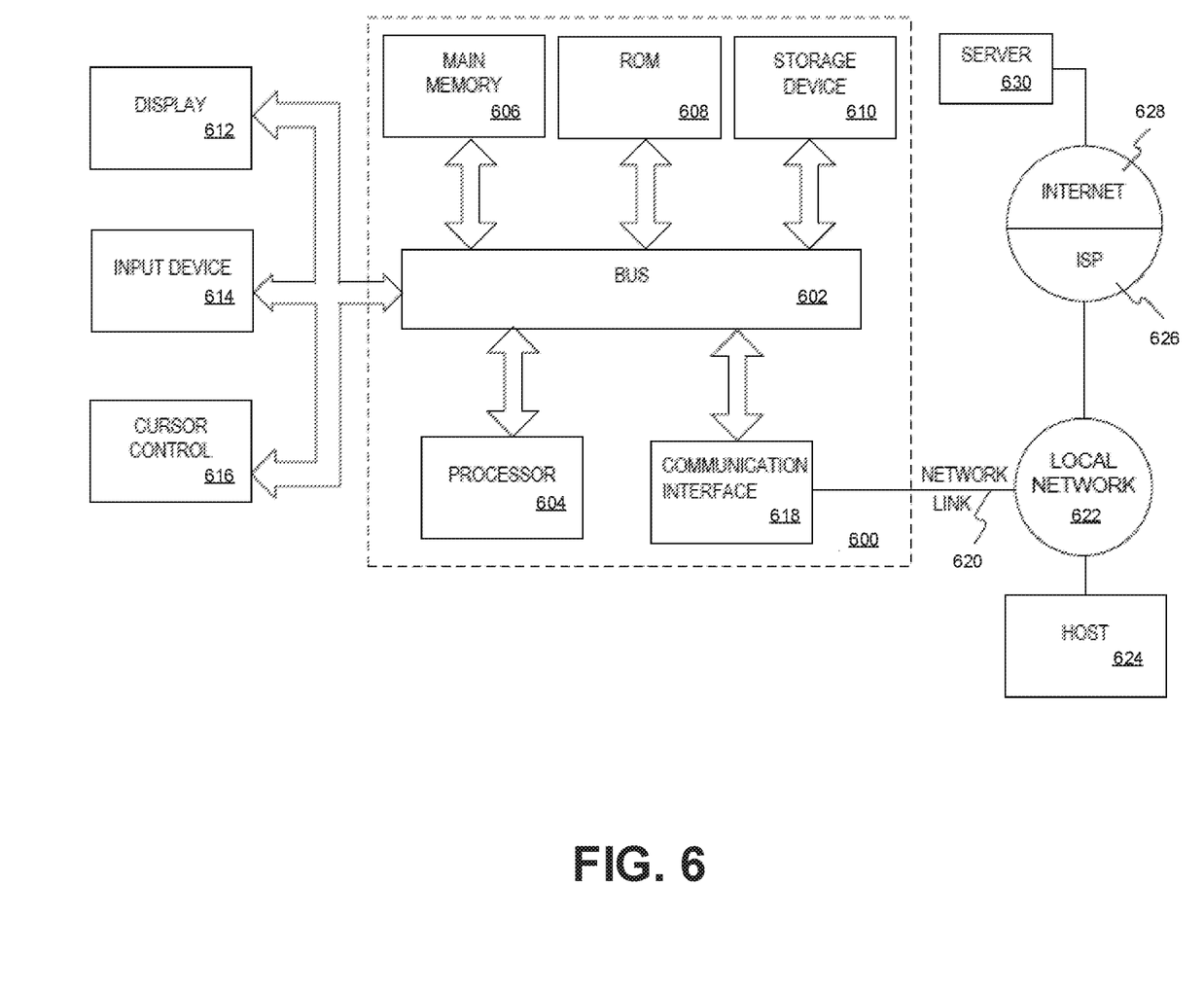
FIG. 6 illustrates a schematic representation of an example computer system in which any of the implementations described herein may be implemented.

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network 622 to a host computer 624 or to data equipment operated by an Internet Service Provider (ISP) 626. The ISP 626 in turn provides data communication services through the world wide packet data communication network now commonly referred to as the "Internet" 628. Local network 622 and Internet 626 both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server 630 might transmit a requested code for an application program through the Internet 626, the ISP 626, the local network 622, and the communication interface 618.

The received code may be executed by processor 604 as it is received, and/or stored in storage device 610, or other non-volatile storage for later execution. In some embodiments, server 630 can provide information for being displayed on a display.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for analyzing data, comprising:
one or more processors; and
a memory storing instructions that, when executed by the one or more processors, cause the system to:
receive a request for an object in accordance with a data analysis procedure;
retrieve data fragments making up or associated with the requested object, wherein each of the data fragments are stored in different data stores, and wherein each of the different data stores are operatively connected to adapter nodes configured to retrieve the data fragments from the respective data stores by identifying the data fragments from an object ID included in the request and determining an appropriate query to search for the data fragments from each of the data stores;
determine a frequency at which a data store storing the object is queried;
based on the frequency, determine whether to adjust a response time of retrieving the data fragments associated with the object;
determine whether to preload the data fragments associated with the object based on the determination of whether to adjust the response time;
selectively preload at least a portion of the data associated with the data store based on the determination of whether to preload the data fragments;

track, by the adapter nodes, metadata and versions of each of the data fragments over time to detect whether a data fragment of the data fragments has become updated;

in response to detecting that a data fragment has become updated, retrieve the data fragment that has become updated and at least an other data fragment of the data fragments;

upon retrieval of the updated data fragment and the other data fragment, join the updated data fragment and the other data fragment to create a canonical view of the object;

and transmit the canonical view of the object to an application from which the request was received.

2. The system of claim 1, further comprising a data analysis platform through which a user of the application performs at least one of an editing procedure, a resolution procedure, and a tagging procedure related to the object.

3. The system of claim 2, wherein the data analysis platform comprises a database storing a third data fragment of the two or more data fragments.

4. The system of claim 1, wherein the data analysis platform comprises a persistent cache implementing a smart versioning function to maintain a most up-to-date version of the third data fragment.

5. The system of claim 4, wherein the instructions further cause the system to query the persistent cache of the data analysis platform prior to querying the data analysis platform.

6. The system of claim 1, wherein a first of the data fragments comprises a different type of data than a second of the data fragments.

7. The system of claim 1, wherein at least one of the data stores maintains a corresponding one of the data fragments in a tabular format.

8. The system of claim 7, wherein a corresponding one of the adapter nodes associated with the at least one of the data stores transforms the corresponding one of the data fragments from the tabular format to an object-based data structure.

9. The system of claim 1, wherein each of the adapter nodes comprises or is operatively connected to a data crawler configured to determine a query format appropriate for querying a corresponding data store.

10. The system of claim 1, wherein the instructions further cause the system to provide one or more application programming interfaces allowing the application to operatively communicate with the data stores.

11. The system of claim 1, wherein the instructions causing the system to join the two or more data fragments further causes the system to append an ID identifying the object to each of the data fragments within the corresponding data stores.

12. The system of claim 1, wherein the instructions cause the system to retrieve the data fragments only at a read-time or write-time operation at the application.

13. The system of claim 1, wherein each of the adapter nodes comprises a persistent cache implementing a smart versioning function to maintain a most up-to-date version of each of the data fragments.

14. The system of claim 13, wherein the instructions further cause the system to query the persistent caches of each of the adapter nodes prior to querying the corresponding data stores.

15. A method being implemented by a computing system including one or more physical processors and storage media storing machine-readable instructions, the method comprising:

receiving a request for an object in accordance with a data analysis procedure;

receiving, at one of a read-time or write-time operation of the data analysis procedure, data associated with the object, the data comprising data fragments, wherein each of the data fragments are stored in different data stores, wherein the receiving comprises identifying the data fragments from an object ID included in the request and determining an appropriate query to search for the data fragments from each of the data stores;

determining a frequency at which a data store storing the object is queried;

based on the frequency, determining whether to adjust a response time of retrieving the data fragments associated with the object;

determining whether to preload the data fragments associated with the object based on the determination of whether to adjust the response time;

selectively preloading at least a portion of the data associated with the data store based on the determination of whether to preload the data fragments;

tracking, by adapter nodes, metadata and versions of each of the data fragments over time to detect whether a data fragment of the data fragments has become updated;

in response to detecting that a data fragment has been updated, retrieving the data fragment that has become updated and at least an other data fragment of the data fragments, wherein the updated data fragment and the other data fragment have been joined to create a canonical view of the object upon retrieval of the updated data fragment and the other data fragment.

16. The method of claim 15, wherein the method further comprises formulating queries for the data fragments in accordance with the respective data stores from which the data fragments originate.

17. The method of claim 15, wherein the method further comprises transforming each of the data fragments from a first data format into an object-based data structure commensurate with that associated with the data analysis procedure.

18. The method of claim 15, wherein the joining of the data fragments comprises appending an ID identifying the object to each of the data fragments within the corresponding data stores.

19. The method of claim 15, wherein the method further comprises querying smart versioning caches associated with each of the data stores prior to querying the data stores to obtain, if present in the smart versioning caches, the data fragments.

20. A non-transitory computer readable medium comprising instructions that, when executed, cause one or more processors to perform:

receiving a request for an object in accordance with a data analysis procedure;

retrieving data fragments making up or associated with the requested object, wherein each of the data fragments are stored in different data stores, and wherein each of the different data stores are operatively connected to adapter nodes configured to retrieve the data fragments from the respective data stores by identifying the data fragments from an object ID included in the request and determining an appropriate query to search for the data fragments from each of the data stores;

determining a frequency at which a data store storing the object is queried;

based on the frequency, determining whether to adjust a response time of retrieving the data fragments associated with the object;

determining whether to preload the data fragments associated with the object based on the determination of whether to adjust the response time;

selectively preloading at least a portion of the data associated with the data store based on the determination of whether to preload the data fragments;

tracking metadata and versions of each of the data fragments over time to detect whether a data fragment of the data fragments has become updated;

in response to detecting that a data fragment has become updated, retrieving the data fragment that has become updated and at least an other data fragment of the data fragments;

upon retrieval of the updated data fragment and the other data fragment, joining the updated data fragment and the other data fragment to create a canonical view of the object; and transmitting the canonical view of the object to an application from which the request was received.

\* \* \* \* \*